(12) United States Patent
Tokunaga et al.

(10) Patent No.: US 9,943,910 B2
(45) Date of Patent: Apr. 17, 2018

(54) CUTTING TOOL (75) Inventors: Takashi Tokunaga, Satsumasendai (JP); Hideyoshi Kinoshita, Satsumasendai (JP)

(73) Assignee: Kyocera Corporation, Kyoto (JP)

( * ) Notice: Subject to any disclaimer, the term of this patent is extended or adjusted under 35 U.S.C. 154(b) by 1055 days.

(21) Appl. No.: 13/994,641

(22) PCT Filed: Dec. 26, 2011

(86) PCT No.: PCT/JP2011/080123
§ 371 (c)(1),
(2), (4) Date: Apr. 18, 2014

(87) PCT Pub. No.: WO2012/086839
PCT Pub. Date: Jun. 28, 2012

(65) Prior Publication Data
US 2014/0227053 A1 Aug. 14, 2014

(30) Foreign Application Priority Data

Dec. 25, 2010 (JP) .................................. 2010-289003
Apr. 26, 2011 (JP) .................................. 2011-098285

(51) Int. Cl.
*B23B 27/14* (2006.01)
*C22C 29/04* (2006.01)
(Continued)

(52) U.S. Cl.
CPC ............ *B23B 27/148* (2013.01); *C22C 1/051* (2013.01); *C22C 29/02* (2013.01);
(Continued)

(58) Field of Classification Search
CPC .. B22F 2005/001; B22F 3/10; B22F 2999/00; C22C 1/051; C22C 29/02; C22C 29/00;
(Continued)

(56) References Cited

U.S. PATENT DOCUMENTS 3,348,967 A * 10/1967 Hucke .................... C04B 41/51
264/332
4,235,630 A * 11/1980 Babu ...................... C22C 29/14
148/423
(Continued)

FOREIGN PATENT DOCUMENTS

EP 0635580 A1 1/1995
EP 1043414 A1 * 10/2000 ............. B23C 5/207
(Continued)

OTHER PUBLICATIONS

European Search Report issued in the corresponding EP application No. 11851198.9 dated Oct. 2, 2015, 6 pages.
(Continued)

*Primary Examiner* — Sara Addisu
(74) *Attorney, Agent, or Firm* — Viering, Jentschura & Partner mbB (57) ABSTRACT

A cutting tool composed of a sintered cermet body is disclosed. The body includes hard phases composed of carbide(s), nitride(s), and carbonitride(s) of metal(s) selected from metals belonging to Groups 4, 5, and 6 of the periodic table including Ti as a main component, and includes first and second hard phases, and a binding phase mainly composed of at least one of Co and Ni. The body includes first and second faces, a cutting edge located at an edge of the first and second faces, and an interior portion located at a depth of 400 μm or more from the first face. When residual stresses are measured by a 2D method, stress of the first hard phase is 80 MPa or more in terms of compressive stress. Stresses of the second hard phase and the binding phase are −50 MPa to 50 Mpa in terms of compressive or tensile stress.

8 Claims, 1 Drawing Sheet (51) Int. Cl.
*C22C 29/02* (2006.01)
*C22C 1/05* (2006.01)
*B22F 5/00* (2006.01)

(52) U.S. Cl.
CPC ..... *B22F 2005/001* (2013.01); *B23B 2222/16* (2013.01); *Y10T 407/27* (2015.01)

(58) Field of Classification Search
CPC .. C22C 29/04; B23C 2222/16; B23B 2222/16
See application file for complete search history.

(56) References Cited

U.S. PATENT DOCUMENTS

| | | | | |
|---|---|---|---|---|
| 4,957,548 | A * | 9/1990 | Shima | C22C 29/04 419/13 |
| 4,985,070 | A * | 1/1991 | Kitamura | C22C 1/051 419/13 |
| 5,145,505 | A | 9/1992 | Saito | |
| 5,577,424 | A * | 11/1996 | Isobe | C22C 29/02 75/236 |
| 5,766,742 | A * | 6/1998 | Nakamura | C22C 29/04 407/119 |
| 5,976,213 | A * | 11/1999 | Rolander | C22C 29/04 419/10 |
| 6,235,382 | B1 * | 5/2001 | Matsubara | B23B 27/141 428/325 |
| 7,811,683 | B2 * | 10/2010 | Zhu | B23B 27/14 407/119 |
| 8,313,842 | B2 * | 11/2012 | Kinoshita | C22C 29/04 428/469 |
| 8,414,229 | B2 * | 4/2013 | Can | B22F 7/062 407/118 |
| 8,580,376 | B2 * | 11/2013 | Kinoshita | C22C 29/02 428/323 |
| 2007/0292672 | A1 * | 12/2007 | Ljungberg | C22C 29/08 428/216 |
| 2008/0276544 | A1 * | 11/2008 | Hirose | C22C 29/067 51/307 |
| 2009/0049953 | A1 * | 2/2009 | Shindo | C22C 29/04 75/238 |
| 2011/0129312 | A1 * | 6/2011 | Kinoshita | C22C 29/02 407/119 |

FOREIGN PATENT DOCUMENTS

| | | | | |
|---|---|---|---|---|
| EP | 1052300 | A1 | 11/2000 | |
| EP | 2316596 | A1 | 5/2011 | |
| JP | 61195951 | A * | 8/1986 | ............. C22C 29/02 |
| JP | 5-9646 | | 1/1993 | |
| JP | 06-017182 | | 1/1994 | |
| JP | 6-17182 | | 1/1994 | |
| JP | 2000345275 | A * | 12/2000 | ............. C22C 29/04 |
| JP | 2004115881 | A * | 4/2004 | |
| JP | 2005194573 | A * | 7/2005 | |
| JP | 2005213599 | A1 * | 8/2005 | |
| WO | 2010013735 | | 2/2010 | |

OTHER PUBLICATIONS

English Translation of International Search Report issued in PCT/JP2011/080123 dated Feb. 21, 2012.

* cited by examiner

CUTTING TOOL

This application is a national phase of the International Patent Application PCT/JP2011/080123 filed Dec. 26, 2011 that claims the priority from Japanese patent applications 2010-289003 filed Dec. 25, 2010 and 2011-098285 filed Apr. 26, 2011. The content of these aforementioned documents is herewith incorporated by reference in their entirety.

TECHNICAL FIELD OF THE INVENTION

The present invention relates to a cutting tool composed of a cermet sintered body.

BACKGROUND OF THE INVENTION

Patent Literature 1 discloses that, by decreasing the binding phase (iron group metal) concentration at the surface portion of a nitrogen-containing TiC-based cermet to be lower than that in the interior portion so that the percentage of the hard phase at the surface portion is increased, a compressive residual stress of 30 kgf/mm$^2$ or more is made to remain at the surface portion of the sintered compact, thereby improving wear resistance, fracture resistance, and thermal shock resistance.

In addition, Patent Literature 2 also discloses that, when WC grains constituting the main crystal phase of a WC-based cemented carbide have a compressive residual stress of 120 kgf/mm$^2$ or more, the WC-based cemented carbide has high strength and good fracture resistance.

Furthermore, Patent Literature 3 describes that, when residual stresses of different magnitudes are applied to a first hard phase and a second hard phase, it is possible to suppress occurrence or development of cracks in the cermet, resulting in improvement in the chipping resistance of the cutting tool.

The following is a list of aforementioned background art:
Patent Literature 1: Japanese Unexamined Patent Application Publication No. H05-9646
Patent Literature 2: Japanese Unexamined Patent Application Publication No. H06-17182
Patent Literature 3: International Publication Pamphlet No. 2010/013735

However, in the method in which residual stress is generated in a sintered cermet body by setting the surface portion and the interior portion to have different contents of the binding phase as in Japanese Patent Application Publication No. H05-9646 described above, since the content ratio of the binding phase with respect to the entire cermet is low, a sufficient amount of residual stress is not applied to the entire cermet, resulting in difficulty in obtaining satisfactory toughness.

Furthermore, in the method in which residual stress is applied uniformly to the hard phase as in Japanese Patent Application Publication No. H06-17182, there is also a limitation in improving the strength of the hard phase.

Furthermore, in the structure of International Publication Pamphlet No. 2010/013735 described above, although the chipping resistance of the cermet as a cutting tool is improved, the cermet tends to have a large deformation due to firing compared to cemented carbides, and when a cutting tool having a complex shape with a plurality of corner cutting edges is produced, there may be a difference in the location or shape of the corner cutting edge depending on the corner used, resulting in problems, such as differences in size when cutting is performed.

The present invention has been achieved to solve the problems described above. It is an object of the present invention to provide a cutting tool having high working accuracy by improving the toughness of a cermet and reducing deformation due to firing.

SUMMARY OF THE INVENTION

According a cutting tool of an embodiment of the present invention, in an interior portion at a depth of 400 µm or more from a surface of an sintered cermet body composed of: a hard phase composed of one or more kinds selected from carbides, nitrides, and carbonitrides of one or more metals selected from metals belonging to Groups 4, 5, and 6 of the periodic table which includes Ti as a main component, and comprising two types of hard phases consisting of a first hard phase and a second hard phase; and a binding phase mainly composed of at least one of Co and Ni, when residual stresses are measured by a 2D method, a residual stress $\sigma_{11}[1i]$ in a direction $\sigma_{11}$ of the first hard phase is 80 MPa or more in terms of compressive stress ($\sigma_{11}[1i] \leq -80$ MPa), a residual stress $\sigma_{11}[2i]$ in the direction $\sigma_{11}$ of the second hard phase is $-50$ MPa to 50 MPa in terms of compressive or tensile stress ($\sigma_{11}[2i] = -50$ MPa to 50 MPa), and a residual stress $\sigma_{11}[bi]$ in the direction $\sigma_{11}$ of the binding phase is in a range of $-50$ MPa to 50 MPa in terms of compressive or tensile stress ($\sigma_{11}[bi] = -50$ MPa to 50 MPa).

Advantageous Effects of Invention

According to an embodiment of the present invention, the hard phase consisting of the sintered cermet body is composed of two types of hard phases: a first hard phase and a second hard phase. In an interior portion at a depth of 400 µm or more from a surface of an sintered cermet, when residual stresses are measured by a 2D method, a residual stress $\sigma_{11}[1i]$ in a direction $\sigma_{11}$ of the first hard phase is 80 MPa or more in terms of compressive stress ($\sigma_{11}[1i] \leq -80$ MPa), a residual stress [2i] in the direction $\sigma_{11}$ of the second hard phase is $-50$ MPa to 50 MPa in terms of compressive or tensile stress ($\sigma_{11}[2i] = -50$ MPa to 50 MPa), and a residual stress $\sigma_{11}[bi]$ in the direction $\sigma_{11}$ of the binding phase is in a range of $-50$ MPa to 50 MPa in terms of compressive or tensile stress ($\sigma_{11}[bi] = -50$ MPa to 50 MPa), and that is, by applying residual stresses of different magnitudes to two types of hard phases, the hardness of the hard phases is increased and the binding force of the binding phase which binds the hard phases together is increased, resulting in suppression of crack propagation by deflecting a propagating direction of a crack by grain boundaries of the hard phases due to increase in binding force of the binding phase that binds hard phases. Thereby, toughness of the sintered cermet body can be improved to improve the toughness of the cutting tool.

DETAILED DESCRIPTION OF THE DRAWINGS

A cutting tool according to an embodiment of the present invention will be described, taking as an example of a throwaway tip having negative tip shape whose rake face and seating surface are identical, with reference to FIG. 1A which is a schematic top view, and FIG. 1B which is a cross-sectional view taken along the line X-X of FIG. 1A, and FIG. 2 which is a scanning electron micrograph of a cross section of a sintered cermet body 6 constituting a tip 1.

Figure 1A:
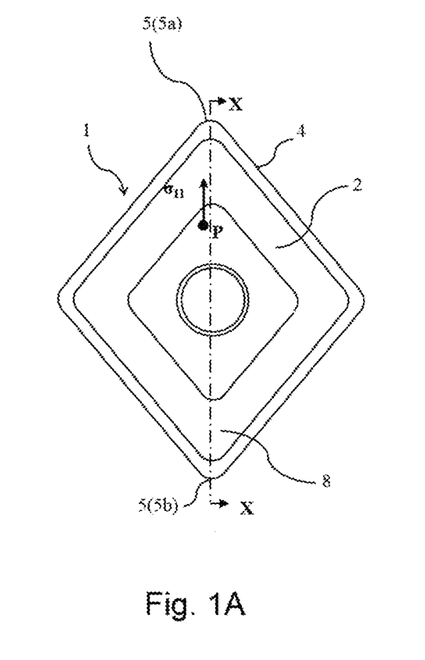
FIG. 1A is a schematic top view of a throwaway tip which is an example of a cutting tool according to an embodiment
Figure 1B:
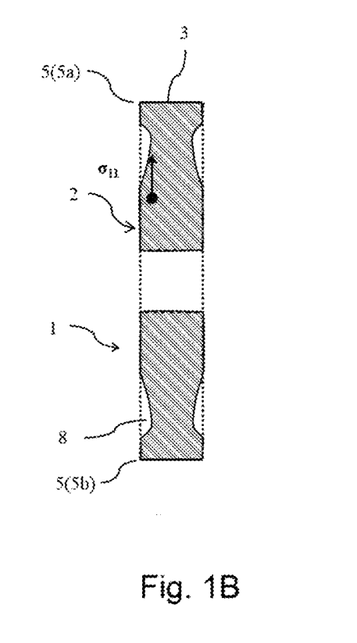
FIG. 1B is a cross-sectional view of the throwaway tip taken along the line X-X in FIG. 1A, showing the measurement position when measuring residual stress at the rake face.

The throwaway tip (hereinafter simply referred to as the "tip") 1 shown in FIGS. 1A, 1B and and 2 has a substantially flat plate shape as shown in FIGS. 1A and 1B, in which a rake face 2 is arranged on a main surface, a flank face 3 is arranged on a side surface, and a cutting edge 4 lies along a cross ridge line section between the rake face 2 and the flank face 3.

The rake face 2 has a polygonal shape, such as a rhombus, triangle, or quadrangle (in FIGS. 1A and 1B, a rhombus with acute apical angles of 80 degrees is used as an example). Acute apical angles (5a and 5b) among the apical angles of the polygonal shape serve as noses 5 which are to be brought into contact with a processing portion of a workpiece and perform cutting.

Figure 2:
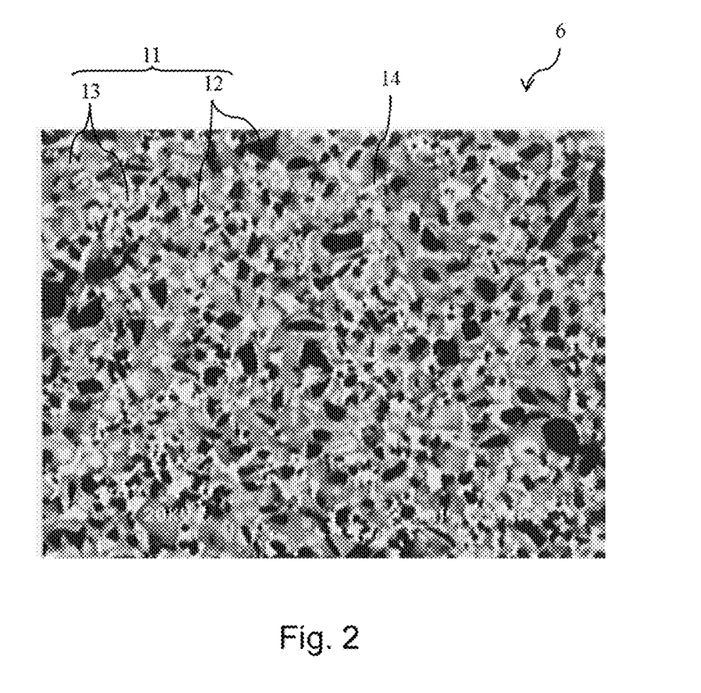
FIG. 2 is a scanning electron micrograph of a cross section of a sintered cermet body constituting the throwaway tip shown in FIG. 1.

As shown in FIG. 2, the sintered cermet body 6 constituting the tip 1 is composed of: a hard phase 11 composed of one or more kinds selected from carbides, nitrides, and carbonitrides of one or more metals selected from metals belonging to Groups 4, 5, and 6 of the periodic table which includes Ti as a main component; and a binding phase 14 mainly composed of at least one of Co and Ni. The hard phase 11 is composed of two types of hard phases: a first hard phase 12 and a second hard phase 13.

The composition of the first hard phase 12 contains 80% by weight or more of Ti element among the metal elements of Groups 4, 5, and 6 of the periodic table, and the composition of the second hard phase 13 contains 30% by weight or more and less than 80% by weight of Ti element among the metal elements of Groups 4, 5, and 6 of the periodic table. Consequently, when the sintered cermet body 6 is observed with a scanning electron microscope, the first hard phases 12 are observed as black grains because they have a higher light element content than the second hard phases 13.

Furthermore, in an X-ray diffraction measurement, as a peak attributable to the (422) plane of Ti(C)N, two peaks of a peak $p_1(422)$ of the first hard phase 12 and a peak $p_2(422)$ of the second hard phase 13 are observed. Similarly, as a peak attributable to the (511) plane of Ti(C)N, two peaks of a peak $p_1(511)$ of the first hard phase 12 and a peak $p_2(511)$ of the second hard phase 13 are observed. The peaks of the first hard phase 12 are observed on a higher angle side than the peaks of the second hard phase 13.

According to an embodiment of the present embodiment, in an interior portion at a depth of 400 μm or more from the surface of the sintered cermet body 6 (hereinafter simply referred to as the "interior portion"), when residual stresses are measured by a 2D method, a residual stress $\sigma_{11}[1i]$ in a direction $\sigma_{11}$ of the first hard phase 12 is 80 MPa or more in terms of compressive stress ($\sigma_{11}[1i] \leq -80$ MPa), a residual stress $\sigma_{11}[2i]$ in the direction $\sigma_{11}$ of the second hard phase 13 is $-50$ MPa to 50 MPa in terms of compressive or tensile stress ($\sigma_{11}[2i]=-50$ MPa to 50 MPa), and a residual stress $\sigma_{11}[bi]$ in the direction $\sigma_{11}$ of the binding phase 14 is in a range of $-50$ MPa to 50 MPa in terms of compressive or tensile stress ($\sigma_{11}[bi]=-50$ MPa to 50 MPa). Consequently, while the deformation of the sintered cermet body 6 is suppressed, compressive stresses of different magnitudes are applied to two types of hard phases, and therefore, cracks are unlikely to occur in two types of the hard phases 11, and tensile stress is applied to grain boundaries between the hard phases 11, resulting in suppression of crack propagation by deflecting a propagating direction of a crack by grain boundaries of the hard phases. Thereby, the toughness of the hard phases of the sintered cermet body 6 is improved to improve the chipping resistance of the tip 1. Regarding a preferable range of $\sigma_{11}[1i]$, $\sigma_{11}[1i]=-160$ MPa to $-350$ MPa, and regarding a preferable range of $\sigma_{11}[2i]$, $\sigma_{11}[2i]=-50$ MPa to $-20$ MPa.

That is, when the residual stress $\sigma_{11}[1i]$ applied to the first hard phase 12 is lower than 80 MPa in terms of compressive stress, the hardness of the hard phase 11 cannot be improved and stress cannot be imparted to the hard phase 11, resulting in a decrease in the chipping resistance of the sintered cermet body 6. Furthermore, when the residual stress $\sigma_{11}[2i]$ applied to the second hard phase 13 is out of the range of $-50$ MPa to 50 MPa, namely, higher than 50 MPa in terms of tensile stress or compressive stress, the deformation of the sintered cermet body 6 due to firing may be large in some cases.

Regarding measurement of the residual stresses $\sigma_{11}$ at the surface and the interior portion of the sintered cermet body 6 of the present invention, measurement is performed at the position P located on the center side, 1 mm or more from the cutting edge 4 of the cutting tool composed of the sintered cermet body 6. Furthermore, as X-ray diffraction peaks used for measuring residual stresses, the peaks of the (511) plane are used in which the value of 2θ appears between 135 and 140 degrees. In this case, considering a peak $p_2(511)$ appearing on the low angle side as the peak attributable to the second hard phase 13 and a peak $p_1(511)$ appearing on the high angle side as the peak attributable to the first hard phase, the residual stresses of the hard phase 11 are measured respectively. Regarding numerical values required for calculating the residual stresses, the calculation is performed using the Poisson's ratio of 0.20 and Young's modulus of 423729 MPa of titanium nitride. Furthermore, regarding X-ray diffraction measurement conditions, the residual stresses are measured by irradiating the mirror-finished rake face using a CuKα ray as the X-ray source at an output of 45 kV and 110 mA.

In this case, the ratio of absolute values of the residual stresses $\sigma_{11}[1i]$ and $\sigma_{11}[2i]$ ($\sigma_{11}[2i]/\sigma_{11}[1i]$) is preferably 0.05 to 0.3 from the viewpoint of adjusting the hardness and deformation of the sintered cermet body 6.

Furthermore, when residual stresses at the surface (unpolished surface or surface which has been subjected to mirror finishing by a thickness of 0.05 mm or less) of the sintered cermet body 6 are measured by the 2D method, preferably, a residual stress $\sigma_{11}[1s]$ in the direction $\sigma_{11}$ of the first hard phase 12 is $-50$ MPa to 50 MPa in terms of compressive stress or tensile stress ($\sigma_{11}[1s]=-50$ MPa to 50 MPa), and a residual stress $\sigma_{11}[2s]$ in the direction $\sigma_{11}$ of the second hard phase 13 is $-50$ MPa to 50 MPa in terms of compressive stress or tensile stress ($\sigma_{11}[2s]=-50$ MPa to 50 MPa) from the viewpoint of suppressing deformation of the sintered cermet body 6 during firing.

Here, regarding the measurement of the residual stresses $\sigma_{11}[1s]$ and $\sigma_{11}[2s]$ at the surface (unpolished surface or surface which has been subjected to mirror finishing by a thickness of 0.05 mm or less) of the cermet, in the case where the rake face 2 has a recessed portion, such as a breaker groove 8, as in the tool shape shown in FIGS. 1A and 1B, the measurement is performed on a flat portion other than the recessed portion. When the surface has a large surface roughness, a flat portion is secured by mirror-finishing the rake face 2 of the sintered cermet body 6 by a thickness of 0.05 mm only such that stress is applied as little as possible, and measurement is performed in that state. In addition, regarding the measurement of $\sigma_{11}[1i]$ and $\sigma_{11}[2i]$, the rake face 2 of the sintered cermet body 6 is polished from the surface by a thickness of more than 0.4 mm (400 μm), then the polished surface is subjected to mirror finishing, and measurement is performed in that state.

Furthermore, regarding the measurement of the residual stresses at the surface of the sintered cermet body 6, even if a coating layer is formed on the surface of the sintered cermet body 6, when the thickness of the coating layer is small and the peaks of the hard phase 11 of the sintered cermet body 6 can be detected, the residual stresses of the hard phase 11 of the sintered cermet body 6 are measured from the surface of the coating layer. When the thickness of the coating layer is large and the peaks of the hard phase 11 of the sintered cermet body 6 cannot be detected, the coating layer is polished to such an extent that the peaks of the hard phase 11 can be detected, and then the residual stresses of the hard phase 11 of the sintered cermet body 6 are measured.

Furthermore, the ratio (c[bs]/c[bi]) of a concentration c[bs] of the binding phase 14 at the surface of the sintered cermet body 6 and a concentration c[bi] of the binding phase 14 in the interior portion of the sintered cermet body 6 is preferably 0.8 to 1.1 from the standpoint that a desired residual stress can be imparted to each of the hard phase 11 and the binding phase 14.

Furthermore, the ratio (S[2i]/S[1i]) of an area ratio S[1i] of the first hard phase 12 in the interior portion and an area ratio S[2i] of the second hard phase 13 in the interior portion is preferably 2 to 4 from the standpoint that a desired residual stress can be imparted to each of the hard phase 11 and the binding phase 14.

Furthermore, regarding the mean grain size of the hard phase 11, in cross-sectional observation of the interior portion of the sintered cermet body 6, preferably, the mean grain size of the first hard phase 12 is 0.3 to 0.7 μm, and the mean grain size of the second hard phase 13 is 0.8 to 1.5 μm from the standpoint that toughness can be enhanced. In the interior portion, the ratio $(d_{2i}/d_{1i})$ between $d_{1i}$ and $d_{2i}$ is preferably 2 to 3, where $d_{1i}$ is the mean grain size of the first hard phase 12 and $d_{2i}$ is the mean grain size of the second hard phase 13, from the viewpoint of controlling the residual stresses of the first hard phase 12 and the second hard phase 13. Furthermore, the mean grain size d of the entire hard phase 11 in the interior portion of the sintered cermet body 6 is preferably 0.3 to 1 μm from the standpoint that predetermined residual stresses can be imparted. Note that, in the present invention, the grain sizes of the hard phase 11 are measured in accordance with the method of measuring the mean grain size of cemented carbide specified in CIS-019D-2005. In this case, when a hard phase 11 has a cored structure in which a first hard phase 12 is located in the center, and the periphery of the first hard phase 12 is surrounded by a second hard phase 13, the grain size of the first hard phase 12, as it is, is considered as the grain size of the first hard phase 12, and the grain size of the second hard phase 13 is calculated under the consideration that a region extending from the first hard phase 12 in the core part to the outer edge of the peripheral part including the second hard phase 13 located in the peripheral part is a single hard phase 11.

Note that the concentration of the binding phase 14 of the sintered cermet body 6, the area ratio between the first hard phase 12 and the second hard phase 13, and the mean grain size of the hard phase 11 are calculated using an image analysis system on the basis of the data measured by energy dispersive spectroscopy attached to an electron microscope (EPMA). Furthermore, in the case where it is necessary to determine a threshold value at the time of data processing, a value of 10% of the maximum count value of the EPMA is calculated as the threshold value.

First hard phases 12 and second hard phases 13 do not all constitute cored structures, but some of them are present independently, and thereby, the residual stresses of the sintered cermet body 6 are adjusted. Preferably, the percentage of the first hard phases 12 constituting cored structures is 60 to 90 area % of all of the first hard phases 12, and the percentage of the second hard phases 13 constituting cored structures is 40 to 80 area % of all of the second hard phases 13. Furthermore, the more preferable range of the first hard phases 12 constituting cored structures is 70 to 80 area % of all of the first hard phases 12, and the more preferable range of the second hard phases 13 constituting cored structures is 60 to 70 area % of all of the second hard phases 13. That is, the percentage of the grains of the first hard phases 12 which do not constitute cored structures and which are present independently is preferably 10 to 40 area %, particularly preferably 20 to 30 area % of all of the first hard phases 12, and the percentage of the grains of the second hard phases 13 which do not constitute cored structures and which are present independently is preferably 20 to 60 area %, particularly preferably 30 to 40 area % of all of the second hard phases 13.

Furthermore, preferably, the hard phase 11 is composed of a carbonitride, and the CN ratio (nitrogen content ratio N/(C+N)), on average in the sintered cermet body 6, is 0.42 to 0.46 from the standpoint that the hardness of the hard phase 11 is enhanced and that the binding phase 14 suppresses occurrence of cracks developing in grain boundaries of the hard phase 11. The CN ratio (nitrogen content ratio N/(C+N)) of the hard phase 11 is preferably in a range of 0.43 to 0.45.

Furthermore, preferably, the CN ratio (nitrogen content ratio N/(C+N)) of the hard phase 11 at the surface of the sintered cermet body 6 is lower than the CN ratio of the hard phase 11 in the interior portion of the sintered cermet body 6 from the standpoint that the deformation of the sintered cermet body 6 due to firing can be decreased.

Furthermore, according to the present embodiment, in the composition of the sintered cermet body 6, the total content ratio of the nitrides or carbonitrides of metals belonging to Groups 4, 5, and 6 of the periodic table is preferably 70% to 96% by mass, particularly preferably 85% to 96% by mass from the viewpoint of improvement in wear resistance. Furthermore, the Ti content ratio among the nitrides or carbonitrides of metals belonging to Groups 4, 5, and 6 of the periodic table is preferably 50% by mass or more, particularly preferably 60% to 90% by mass from the viewpoint of the balance between the hardness and toughness of the sintered cermet body 6. On the other hand, the content ratio of the binding phase 14 is preferably 4% to 30% by mass, particularly preferably 10% to 15% by mass, this resulting in a good balance between the hardness and toughness of the sintered cermet body 6. Furthermore, preferably, the composition of the sintered cermet body 6 specifically includes 5% to 15% by mass of Co, 2% to 10% by mass of Ni, 40% to 70% by mass of TiCN, 5% to 30% by mass of WC, 5% to 30% by mass of NbC, 1.0% to 3.0% by mass of VC, 0% to 5% by mass of MoC, 0% to 10% by mass of TaC, and 0% to 3.0% by mass of ZrC, and due to this, it is possible to achieve both the wear resistance and chipping resistance of the sintered cermet body 6.

Furthermore, when a coating layer (not shown) is formed on the surface of a base made of the sintered cermet body 6 and residual stresses are measured through the surface of the coating layer on the rake face 2 by a 2D method, preferably, the residual stress ($\sigma_{11}$[2cs]) of the second hard phase 13 in an in-plane direction ($\sigma_{11}$ direction) of the rake face 2 is 60 MPa or more in terms of compressive stress ($\sigma_{11}$[2cs]–60 MPa), and the residual stress ($\sigma_{11}$[2cs]) is 1.1 times or more the residual stress ($\sigma_{11}$[2 ns]) in the $\sigma_{11}$ direction of the second hard phase 13 of the sintered cermet body 6 before forming the coating layer, from the viewpoint of enhancing adhesion of the coating layer.

In the present embodiment, a known hard film composed of TiN, TiCN, TiAlN, $Al_2O_3$ or the like may be formed as a coating layer (not shown) on the surface of a sintered cermet body using a known thin film formation method, such as a physical vapor deposition method (PVD method) or chemical vapor deposition method (CVD method). In particular, the coating layer is preferably composed of $Ti_{1-a-b-c-d}Al_a$-$W_bSi_cM_d(C_xN_{1-x})$ (where M is one or more kinds selected from Nb, Mo, Ta, Hf, and Y, $0.45 \leq a \leq 0.55$, $0.01 \leq b \leq 0.1$, $0 \leq c \leq 0.05$, $0 \leq d \leq 0.1$, and Furthermore, the tool of the present invention is applicable to general turning tools of throwaway tip type, grooving tools, threading tools, end mills, drills, solid end mills, solid drills, and the like.

(Manufacturing Method)

An example of a method of manufacturing the above-described cermet will be described below.

First, a powder mixture is prepared by mixing a TiCN powder with a mean particle size of 0.1 to 2 μm, preferably 0.2 to 1.2 μm, a VC powder with a mean particle size of 0.1 to 2 μm, any one of a carbide powder, a nitride powder, and a carbonitride powder of the other metal described above with a mean particle size of 0.1 to 2 μm, a Co powder with a mean particle size of 0.8 to 2.0 μm, a Ni powder with a mean particle size of 0.5 to 3.0 μm, and optionally a $MnCO_3$ powder with a mean particle size of 0.5 to 10 μm. In some cases, a TiC powder or TiN powder may be added to starting materials. These starting material powders constitute TiCN in the cermet after being fired. Then, a binder is added to the powder mixture, and granules with a mean particle size of 10 to 200 μm are formed by a spray drying method or the like. The granules are formed into a predetermined shape by press forming.

Subsequently, a binder is added to the powder mixture to form into a predetermined shape by a known forming method, such as press forming, extrusion molding, or injection molding. Subsequently, according to the present invention, by performing firing under the following conditions, the cermet having a predetermined structure described above can be produced.

Firing conditions in a first embodiment are described below, and firing is performed in a firing pattern in which the following steps (a) to (h) are carried out in that order:

(a) a step of increasing the temperature, in a vacuum, from room temperature to 1,200° C., (b) a step of increasing the temperature, in a vacuum, from 1,200° C. to a firing temperature (referred to as temperature $T_1$) of 1,330° C. to 1,380° C. at a heating rate $r_1$ of 0.1 to 2° C./min, (c) a step of changing the atmosphere in a firing furnace to an inert gas atmosphere of 30 to 2,000 Pa at the temperature $T_1$ and increasing the temperature from the temperature $T_1$ to a firing temperature (referred to as temperature $T_2$) of 1,450° C. to 1,600° C. at a heating rate $r_2$ of 4 to 15° C./min, (d) a step of holding the compact at the temperature $T_2$ for 0.5 to 2 hours while maintaining the inert gas atmosphere of 30 to 2,000 Pa, (e) a step of decreasing the temperature, in an inert gas atmosphere of 0.1 to 0.9 MPa, to a temperature (referred to as temperature $T_3$) of 100° C. or lower at a cooling rate $r_3$ of 10 to 50° C./min, (f) a step of increasing the temperature from the temperature $T_3$ to 800° C. to 1,100° C. (referred to as temperature $T_4$) at a heating rate $r_4$ of 10 to 20° C./min while maintaining the same atmosphere as that in step (e), (g) a step of changing the gas pressure of the inert gas to 0.1 to 0.9 MPa at the point when the temperature is increased to the temperature $T_4$ and cooling the compact to room temperature at a cooling rate $r_5$ of 20 to 50° C./min, and (h) a step of immersing the compact in liquid nitrogen for 10 seconds, taking it out, and bringing it back to room temperature.

That is, in the firing conditions described above, when the heating rate $r_1$ in step (b) is set at 2° C./min or less, it is possible to suppress occurrence of voids at the surface of the cermet. At a heating rate $r_1$ of 0.1° C./min or more, the firing time can sustain productivity. When the temperature is increased from the temperature $T_1$ in a gas atmosphere of 30 Pa or more in step (c), occurrence of surface voids can be reduced. When steps (e) and (g) are carried out in the predetermined gas atmosphere described above, by carrying out steps (f), (g), and (h), residual stresses in the hard phase and the binding phase can be controlled. Furthermore, when the heating or cooling rate in each of steps (e), (f), and (g) is in the predetermined range, it is also possible to control residual stresses in the hard phase and the binding phase within predetermined ranges. That is, regarding the firing conditions described above, by satisfying the conditions in steps (a) to (h), residual stresses can be controlled within predetermined ranges.

The main surface of the sintered cermet body manufactured by the above method is, if desired, subjected to grinding (double-head grinding) with a diamond grinder, a grinder using SiC abrasive grains, or the like. Furthermore, if desired, the side surface of the sintered cermet body 6 is machined, and the cutting edge is subjected to horning by barrel finishing, brushing, blasting, or the like. In the case where a coating layer is formed, if desired, the surface of the sintered compact 6 before film formation is subjected to a cleaning step or the like.

The step of forming a coating layer on the surface of the resulting sintered cermet, if desired, will be described below.

Although a chemical vapor deposition (CVD) method may be employed as the method of forming the coating layer, a physical vapor deposition (PVD) method, such as ion plating method or sputtering method, is suitably employed. A specific example of the film formation method will be described in detail below. In the case where a coating layer is formed by ion plating method, metal targets independently containing titanium metal (Ti), aluminum metal (Al), tungsten metal (W), silicon metal (Si), and a metal M (M is one or more metals selected from Nb, Mo, Ta, Hf, and Y) or a composite alloy target containing these metals is used. Film deposition is performed by evaporating and ionizing the metal sources by means of arc discharge, glow discharge, or the like, and at the same time, by allowing them to react with nitrogen ($N_2$) gas as a nitrogen source and methane ($CH_4$)/acetylene ($C_2H_2$) gas as a carbon source.

In this case, as a pretreatment for forming the coating layer, bombardment treatment is carried out in which, by applying a high bias voltage, particles, such as Ar ions, are scattered, such as Ar gas, toward the sintered cermet body so as to bombard the surface of the sintered cermet body 6.

As specific conditions for the bombardment treatment in the present invention, for example, first, in a PVD furnace for ion plating, arc ion plating, or the like, a tungsten filament is heated using an evaporation source, thereby converting the evaporation source into a plasma state in the furnace. Then, it is suitable to perform bombardment under the conditions of a furnace internal pressure of 0.5 to 6 Pa, a furnace internal temperature of 400° C. to 600° C., and a treatment time of 2 to 240 minutes. In the present invention, by performing bombardment treatment on the sintered cermet body with a bias voltage of −600 to −1,000 V, which is higher than the normal bias voltage of −400 to −500 V, using Ar gas or Ti metal, a predetermined residual stress can be imparted to each of the first hard phase 12 and the second hard phase 13 of the hard phase 11 of the sintered cermet body 6 of the tip 1.

Then, the coating layer is formed by ion plating method or sputtering method. As specific film formation conditions, for example, in the case where ion plating is used, the film formation temperature is preferably set at 200° C. to 600° C., and a bias voltage of 30 to 200 V is preferably applied in order to produce a coating layer with high hardness by controlling the crystal structure and orientation of the coating layer and in order to enhance adhesion with the base.

EXAMPLES

A powder mixture was prepared by mixing a TiCN powder with a mean particle size ($d_{50}$ value) of 0.6 μm, measured by the Microtrac method, a WC powder with a mean particle size of 1.1 μm, a TiN powder with a mean particle size of 1.5 μm, a VC powder with a mean particle size of 1.0 μm, a TaC powder with a mean particle size of 2 μm, a MoC powder with a mean particle size of 1.5 μm, a NbC powder with a mean particle size of 1.5 μm, a ZrC powder with a mean particle size of 1.8 μm, a Ni powder with a mean particle size of 2.4 μm, a Co powder with a mean particle size of 1.9 μm, and a $MnCO_3$ powder with a mean particle size of 5.0 μm at the ratios shown in Table 1. The powder mixture was subjected to wet mixing, with addition of isopropyl alcohol (IPA), using a stainless steel ball mill and cemented carbide balls, and 3% by mass of paraffin was added to the mixture, followed by mixing. The resulting mixture was fed into an attritor mill, and granules with a mean particle size of 200 μm were produced by spray drying.

Then, the granules were press-formed into a throwaway tip tool shape at a pressing pressure of 200 MPa, and firing was performed in a firing pattern in which the following steps were carried out: step (a) of increasing the temperature to 1,200° C. at a heating rate of 10° C./min, step (b) of increasing the temperature to 1,350° C. at a heating rate of 1° C./min, step (c) of increasing the temperature, in nitrogen gas at 1,500 Pa, to the temperature $T_2$ shown in Table 2 at a heating rate of 7° C./min, step (d) of holding the compact for 1 hour while maintaining the atmosphere, step (e) of decreasing the temperature to 100° C. in the atmosphere at the cooling rate, which are shown in Table 1, step (f) shown in Table 2 (while maintaining the atmosphere in step (e)), step (g) of cooling, and step (h) of immersing the compact in liquid nitrogen (Table 2 shows whether or not this step was performed). Subsequently, Ti bombardment treatment was performed on the resulting sintered cermet body at a bias voltage of −1,000 V, at 600° C., for 30 minutes, and then a TiAlN coating layer was formed with a thickness of 2 μm by a PVD method. Thereby, throw away tips composed of the cermets of Sample Nos. 1 to 14 were obtained.

TABLE 1

| | Starting material composition (mass %) | | | | | | | | | | |
| | | | | | | | | | Iron group metal | | |
| Sample No. | TiCN | TiN | WC | TaC | MoC | NbC | ZrC | VC | Ni | Co | Co + Ni |
| --- | --- | --- | --- | --- | --- | --- | --- | --- | --- | --- | --- |
| 1 | Balance | 12 | 12 | 3 | 10 | 3 | 0.0 | 0.0 | 6 | 6 | 12 |
| 2 | Balance | 14 | 25 | 5 | 12 | 4 | 0.0 | 0.0 | 6 | 14 | 20 |
| 3 | Balance | 15 | 18 | 2 | 8 | 4 | 0.0 | 0.0 | 5 | 11 | 16 |
| 4 | Balance | 18 | 21 | 0 | 0 | 10 | 0.0 | 0.0 | 9 | 9 | 18 |
| 5 | Balance | 15 | 25 | 1 | 0 | 8 | 1.0 | 0.0 | 9 | 9 | 18 |
| 6 | Balance | 18 | 15 | 0 | 0 | 0 | 0.5 | 2.0 | 5 | 15 | 20 |
| 7 | Balance | 15 | 18 | 2 | 8 | 4 | 0.0 | 0.0 | 4 | 10 | 14 |
| 8 | Balance | 12 | 18 | 2 | 8 | 4 | 1.0 | 1.0 | 5 | 11 | 16 |
| 9 | Balance | 12 | 18 | 2 | 8 | 4 | 1.0 | 0.0 | 5 | 11 | 16 |
| 10 | Balance | 18 | 21 | 0 | 0 | 10 | 0.0 | 0.0 | 9 | 9 | 18 |
| 11 | Balance | 18 | 21 | 0 | 0 | 10 | 1.0 | 1.0 | 9 | 9 | 18 |
| 12 | Balance | 18 | 15 | 0 | 0 | 0 | 0.5 | 2.0 | 5 | 15 | 20 |
| 13 | Balance | — | 20 | 5 | 10 | 5 | 0.5 | 0.0 | 5 | 13 | 18 |
| 14 | Balance | 16 | 15 | 1 | 0 | 2 | 0.5 | 1.0 | 5 | 13 | 18 |

TABLE 2

| | | | Firing conditions | | | | | | |
| | Step (c) | Step (e) | | Step (f) | | Step (g) | | Step (h) |
| Sample No. | Temperature $T_2$ (° C.) | Cooling rate $r_3$ (° C./min) | Firing atmosphere | Heating rate $r_4$ (° C./min) | Temperature $T_4$ (° C.) | Firing atmosphere | Cooling rate $r_5$ (° C./min) | Performed or not performed |
| --- | --- | --- | --- | --- | --- | --- | --- | --- |
| 1 | 1575 | 20 | $N_2$ 0.6 MPa | 15 | 1000 | $N_2$ 0.5 MPa | 20 | Performed |
| 2 | 1500 | 20 | Ar 0.1 MPa | 10 | 800 | Ar 0.9 MPa | 50 | Performed |
| 3 | 1575 | 20 | Ar 0.5 MPa | 20 | 1000 | Ar 0.6 MPa | 40 | Performed |

TABLE 2-continued

| | | | Firing conditions | | | | | |
|---|---|---|---|---|---|---|---|---|
| | Step (c) | Step (e) | | Step (f) | | Step (g) | | Step (h) |
| Sample No. | Temperature $T_2$ (° C.) | Cooling rate $r_3$ (° C./min) | Firing atmosphere | Heating rate $r_4$ (° C./min) | Temperature $T_4$ (° C.) | Firing atmosphere | Cooling rate $r_5$ (° C./min) | Performed or not performed |
| 4 | 1600 | 30 | Ar 0.6 MPa | 20 | 1100 | Ar 0.2 MPa | 20 | Performed |
| 5 | 1550 | 50 | $N_2$ 0.1 MPa | 20 | 1000 | $N_2$ 0.9 MPa | 50 | Performed |
| 6 | 1550 | 50 | Ar 0.6 MPa | 20 | 1000 | Ar 0.6 MPa | 40 | Performed |
| 7 | 1600 | 20 | $N_2$ 0.1 MPa | 3 | 800 | $N_2$ 0.1 MPa | 20 | Performed |
| 8 | 1550 | 30 | Ar 0.2 MPa | 10 | 500 | Ar 0.6 MPa | 50 | Performed |
| 9 | 1475 | 40 | Ar 0.5 MPa | 20 | 1000 | Vacuum | 10 | Performed |
| 10 | 1400 | 30 | Ar 0.2 MPa | 20 | 1550 | Ar 0.2 MPa | 20 | Performed |
| 11 | 1500 | 50 | Vacuum | 20 | 1000 | $N_2$ 0.1 MPa | 50 | Performed |
| 12 | 1550 | 5 | Ar 0.6 MPa | 20 | 1100 | $N_2$ 0.6 MPa | 40 | Performed |
| 13 | 1525 | 50 | Ar 0.6 MPa | 20 | 1000 | $N_2$ 0.5 MPa | 40 | Not performed |
| 14 | 1500 | 30 | Ar 0.6 MPa | 15 | 1000 | Ar 0.3 MPa | 20 | Performed |

For each of the resulting throw away tips composed of the cermets, the cermet composition was measured by ICP analysis. The results are shown in Table 3. Regarding the cermet composition, volatilization of metal components or the like was not observed compared to the starting material composition. However, the TiN powder was changed to TiCN. Then, scanning electron microscope (SEM) observation was performed. For each of optional five locations in the interior portion in a photograph with a magnification of 10,000 times, image analysis was performed in a region of 8 μm×8 μm, and the mean grain size and content ratio of each of the first hard phase and the second hard phase were calculated. Furthermore, as a result of structure observation, it was confirmed that each of the samples includes hard phases having a cored structure in which the periphery of a first hard phase is surrounded by a second hard phase. The results are shown in Table 4.

TABLE 3

| | Sintered compact composition (mass %) | | | | | | | |
|---|---|---|---|---|---|---|---|---|
| Sample No. | TiCN | WC | TaC | MoC | NbC | ZrC | VC | Ni | Co |
| 1 | Balance | 12 | 3 | 10 | 3 | 0.0 | 0.0 | 6 | 6 |
| 2 | Balance | 25 | 5 | 12 | 4 | 0.0 | 0.0 | 6 | 14 |
| 3 | Balance | 18 | 2 | 8 | 4 | 0.0 | 0.0 | 5 | 11 |
| 4 | Balance | 21 | 0 | 0 | 10 | 0.0 | 0.0 | 9 | 9 |
| 5 | Balance | 25 | 1 | 0 | 8 | 1.0 | 0.0 | 9 | 9 |
| 6 | Balance | 15 | 0 | 0 | 0 | 0.5 | 2.0 | 5 | 15 |
| 7 | Balance | 18 | 2 | 8 | 4 | 0.0 | 0.0 | 4 | 10 |
| 8 | Balance | 18 | 2 | 8 | 4 | 1.0 | 1.0 | 5 | 11 |
| 9 | Balance | 18 | 2 | 8 | 4 | 1.0 | 0.0 | 5 | 11 |
| 10 | Balance | 21 | 0 | 0 | 10 | 0.0 | 0.0 | 9 | 9 |
| 11 | Balance | 21 | 0 | 0 | 10 | 1.0 | 1.0 | 9 | 9 |
| 12 | Balance | 15 | 0 | 0 | 0 | 0.5 | 2.0 | 5 | 15 |
| 13 | Balance | 20 | 5 | 10 | 5 | 0.5 | 0.0 | 5 | 13 |
| 14 | Balance | 15 | 1 | 0 | 2 | 0.5 | 1.0 | 5 | 13 |

TABLE 4

| | Hard phase | | | | | | Cored structure ratio | | Binding phase | | |
|---|---|---|---|---|---|---|---|---|---|---|---|
| Sample No. | $d_{1i}$ (μm) | $d_{2i}$ (μm) | $d_2/d_1$ | $S_{1i}$ (Area %) | $S_{2i}$ (Area %) | $S_{2i}/S_{1i}$ | $C_1$ (Area %) | $C_2$ (Area %) | c[bs] (wt %) | c[bi] (wt %) | c[bs]/c[bi] |
| 1 | 0.50 | 1.00 | 2.00 | 17.0 | 68.0 | 4.00 | 87 | 67 | 14 | 12 | 0.86 |
| 2 | 0.40 | 1.10 | 2.75 | 23.0 | 50.0 | 2.17 | 59 | 68 | 19 | 20 | 1.05 |
| 3 | 0.60 | 0.90 | 1.50 | 15.0 | 65.0 | 4.33 | 72 | 83 | 12 | 16 | 1.33 |
| 4 | 0.60 | 1.10 | 1.83 | 13.0 | 65.0 | 5.00 | 92 | 38 | 13 | 18 | 1.38 |
| 5 | 0.30 | 0.70 | 2.33 | 17.0 | 60.0 | 3.53 | 78 | 69 | 19 | 18 | 0.95 |
| 6 | 0.40 | 1.20 | 3.00 | 16.0 | 56.0 | 3.50 | 75 | 52 | 18 | 20 | 1.11 |
| 7 | 0.50 | 1.00 | 2.00 | 13.0 | 70.0 | 5.38 | 90 | 88 | 11 | 14 | 1.27 |
| 8 | 0.40 | 1.10 | 2.75 | 16.0 | 70.0 | 4.38 | 60 | 58 | 21 | 16 | 0.76 |
| 9 | 0.60 | 0.90 | 1.50 | 22.0 | 51.0 | 2.32 | 45 | 40 | 13 | 16 | 1.23 |
| 10 | 0.50 | 0.80 | 1.60 | 23.0 | 53.0 | 2.30 | 40 | 40 | 23 | 18 | 0.78 |
| 11 | 0.30 | 0.90 | 3.00 | 18.0 | 57.0 | 3.17 | 68 | 63 | 15 | 20 | 1.33 |
| 12 | 0.40 | 1.20 | 3.00 | 15.0 | 71.0 | 4.73 | 75 | 72 | 22 | 18 | 0.82 |
| 13 | 0.40 | 1.20 | 3.00 | 20.0 | 67.0 | 3.35 | 70 | 70 | 20 | 18 | 0.90 |
| 14 | 0.25 | 0.70 | 2.80 | 25.0 | 50.0 | 2.00 | 55 | 58 | 10 | 17 | 1.70 |

Furthermore, in each of the throw away tips, residual stresses of the first hard phase and the second hard phase were measured at the surface in a mirror state obtained by polishing the rake face by 0.05 mm and in the interior portion in a mirror state obtained by grinding from the rake face with a thickness of 0.5 mm, using a 2D method (apparatus: X-ray diffraction D8 DISCOVER with GADDS Super Speed manufactured by BrukerAXS Corp., ray source: CuKα, collimator diameter: 0.3 mmφ, measured diffraction line: TiN (422) plane). Furthermore, nitrogen was measured by a thermal conductivity method, carbon was measured by an infrared absorption method, and the CN ratio in the whole sintered cermet body was measured. The CN ratios at the surface (surface obtained by mirror finishing to a depth of 0.05 m from the surface) of the sintered cermet body and in the interior portion (surface obtained by polishing to a depth of 500 μm from the surface, followed by mirror finishing) were measured by X-ray photoelectron spectroscopy (XPS method). The results are shown in Table 4.

Furthermore, a cutting test was carried out using cutting tools (throw away tips: BDMT111Y308ERJT manufactured by KYOCERA Corporation) made of the cermets under the following cutting conditions. The results are also shown in Table 6.

TABLE 5

| Sample No. | CN ratio (N/(C + N)) | | | Residual stress | | | | | |
|---|---|---|---|---|---|---|---|---|---|
| | Whole | Surface | Interior | $\sigma_{11}$ [1i] (MPa) | $\sigma_{11}$ [2i] (MPa) | $\sigma_{11}$ [bi] (MPa) | $\sigma_{11}$ [2i]/ $\sigma_{11}$ [1i] | $\sigma_{11}$ [1s] (MPa) | $\sigma_{11}$ [2s] (MPa) |
| 1 | 0.45 | 0.43 | 0.47 | −311 | −41 | −11 | 0.13 | 48 | −48 |
| 2 | 0.43 | 0.42 | 0.45 | −161 | −49 | −48 | 0.30 | −15 | −52 |
| 3 | 0.46 | 0.45 | 0.47 | −151 | −12 | −28 | 0.08 | 53 | 55 |
| 4 | 0.42 | 0.40 | 0.43 | −420 | −11 | 38 | 0.03 | −52 | 57 |
| 5 | 0.44 | 0.39 | 0.44 | −201 | −39 | −49 | 0.19 | 20 | 14 |
| 6 | 0.44 | 0.42 | 0.45 | −240 | −29 | −35 | 0.12 | −49 | 11 |
| 7 | 0.41 | 0.40 | 0.41 | −355 | −55 | −85 | 0.15 | 15 | 55 |
| 8 | 0.44 | 0.44 | 0.44 | −35 | −45 | −73 | 1.29 | −41 | 26 |
| 9 | 0.46 | 0.45 | 0.47 | −150 | −125 | −130 | 0.83 | −10 | 75 |
| 10 | 0.46 | 0.46 | 0.46 | −24 | −250 | −93 | 10.42 | 5 | −1 |
| 11 | 0.41 | 0.41 | 0.41 | 20 | −90 | −35 | 4.50 | 2 | −39 |
| 12 | 0.43 | 0.45 | 0.42 | −278 | −131 | −81 | 0.47 | −11 | 4 |
| 13 | 0.46 | 0.46 | 0.46 | −23 | −10 | −28 | 0.43 | 9 | −60 |
| 14 | 0.42 | 0.41 | 0.43 | −90 | 20 | −50 | 0.22 | −55 | −20 |

Next, a cutting test 1 was carried out using cutting tools (CNMG120408 shape) made of the resulting cermets under the following cutting conditions. The results are shown in Table 6.
(Cutting Test 1)
(Wear Resistance Evaluation)
Workpiece: SCM435
Cutting speed: 200 m/min
Feed: 0.20 mm/rev
Cutting depth: 1.0 mm
Cutting state: Wet (using water-soluble cutting fluid)
Evaluation method: Time until wear depth reaches 0.2 mm
(Chipping Resistance Evaluation)
Workpiece: S45C
Cutting speed: 120 m/min
Feed rate: 0.05 to 0.05 mm/rev
Depth of cut: 1.5 mm
Cutting state: Dry
Evaluation method: Time (sec) until fracture occurs at each feed rate 10 S and cutting state (Cutting Test 2)
Workpiece: SCM440H
Cutting speed: 150 m/min
Cutting depth: 2.0 mm
Feed: 0.2 mm/tooth
Cutting state: Dry The surface roughness of the bottom face of the workpiece at the point when the length of cut reached 8 m was measured, and also the length of cut at which the surface roughness reached 0.70 μm by extending cutting was measured.

TABLE 6

| Sample No. | Cutting test 1 | | | Cutting test 2 | | |
|---|---|---|---|---|---|---|
| | Chipping resistance (sec) | Wear resistance (min) | Remarks | Surface roughness (μm) | Length of cut (m) | Remarks |
| 1 | 79 | 115 | Good | 0.22 | 50 | Good |
| 2 | 64 | 104 | Good | 0.28 | 38 | Good |
| 3 | 84 | 101 | Good | 0.29 | 32 | Good |
| 4 | 89 | 97 | Good | 0.31 | 30 | Good |
| 5 | 112 | 145 | Good | 0.17 | 75 | Good |
| 6 | 95 | 130 | Good | 0.21 | 60 | Good |
| 7 | 54 | 64 | Large amount of chatter | 0.51 | 15 | Large amount of chatter |
| 8 | 69 | 71 | Large amount of chatter | 0.49 | 18 | Large amount of chatter |
| 9 | 44 | 51 | Sudden fracturing | 0.59 | 13 | Sudden fracturing |
| 10 | 43 | 57 | Large amount of chatter | 0.55 | 14 | Large amount of chatter |
| 11 | 28 | 64 | Sudden fracturing | 0.56 | 10 | Sudden fracturing |
| 12 | 41 | 48 | Large amount of chatter | 0.70 | 8 | Large amount of chatter |
| 13 | 41 | 48 | Large amount of wear | 0.59 | 11 | Large amount of wear |
| 14 | 90 | 85 | Small amount of wear | 0.21 | 25 | Small amount of wear |

As is evident from Tables 1 to 6, in Sample Nos. 7 to 13 having residual stresses out of the ranges of the present invention, the toughness of the tools was not sufficient, chipping of the cutting edge or sudden fracturing of the cutting edge occurred early in the cutting test 1, and it was not possible to obtain sufficient tool life. In contrast, in Sample Nos. 1 to 6 and No. 14 which are within the ranges of the present invention, since high toughness was exhibited, chipping of the cutting edge did not occur in the cutting test 1, and good tool life was achieved. Furthermore, in the cutting test 2, in Sample Nos. 7 to 13 which are out of the ranges of the present invention, the position of the cutting edge was deviated from the designed position under the influence of deformation due to firing, and the surface roughness of the cutting surface degraded at the point when cutting was performed by 15 m. Furthermore, when the cutting evaluation was continued, wear increased, and chipping of the cutting edge occurred. Consequently, the processable length of cut was shortened. In contrast, in Sample Nos. 1 to 6 and No. 14 which are within the ranges of the present invention, deformation due to firing was small, and the surface roughness of the cutting surface was satisfactory at the point when cutting was performed by 15 m. Even when the cutting evaluation was continued, wear did not increase, and chipping did not occur. Consequently, the processable length of cut was long.

REFERENCE SYMBOLS 1 tip (throwaway tip)
2 rake face
3 flank face
4 cutting edge
5 nose
6 sintered cermet body
8 breaker groove
11 hard phase
12 first hard phase
13 second hard phase
14 binder phase
Direction $\sigma_{11}$
a direction parallel to a rake face and directed from the center of the rake face toward a nose that is nearest to the measurement point.

The invention claimed is:

1. A cutting tool composed of a sintered cermet body, the sintered cermet body comprising:
hard phases composed of one or more selected from carbides, nitrides, and carbonitrides of one or more metals selected from metals belonging to Groups 4, 5, and 6 of the periodic table which comprises Ti as a main component, and comprises a first hard phase and a second hard phase, and
a binding phase mainly composed of at least one of Co and Ni,
wherein the sintered cermet body comprises
a first face,
a second face,
a cutting edge located at an edge of the first face and the second face, and
an interior portion located at a depth of 400 µm or more from the first face,
when residual stresses are measured by a 2D method, a residual stress $\delta_{11}$ of the first hard phase is 80 MPa or more in terms of compressive stress ($\delta_{11}[1i] \leq -80$ MPa), a residual stress $\sigma_{11}[2i]$ of the second hard phase is $-50$ MPa to 50 MPa in terms of compressive or tensile stress ($\sigma_{11}[2i] = -50$ MPa to 50 MPa), and a residual stress $\sigma_{11}[bi]$ of the binding phase is in a range of $-50$ MPa to 50 MPa in terms of compressive or tensile stress ($\delta_{11}[bi] = -50$ MPa to 50 MPa).

2. The cutting tool according to claim 1, wherein the ratio of absolute values of the residual stresses σ11[1i] and σ11[2i]($\sigma$11[2i]/$\sigma$11[1i]) is 0.05 to 0.3.

3. The cutting tool according to claim 1, wherein, when residual stresses at the first face and/or the second face of the sintered cermet body are measured by the 2D method, a residual stress $\sigma_{11}[1s]$ of the first hard phase is $-50$ MPa to 50 MPa in terms of compressive stress or tensile stress ($\sigma_{11}[1s] = -50$ MPa to 50 MPa), and a residual stress $\sigma_{11}[2s]$ of the second hard phase is $-50$ MPa to 50 MPa in terms of compressive stress or tensile stress ($\sigma_{11}[2s] = -50$ MPa to 50 MPa).

4. The cutting tool according to claim 1, wherein the ratio of a concentration c[bs] of the binding phase at the first face and/or the second face of the sintered cermet body and a concentration c[bi] of the binding phase in the interior portion of the sintered cermet body (c[bs]/c[bi]) is 0.8 to 1.1.

5. The cutting tool according to claim 1, wherein the ratio of an area ratio S[1i] of the first hard phase in the interior portion and an area ratio S[2i] of the second hard phase in the interior portion (S[2i]/S[1i]) is 2 to 4.

6. The cutting tool according to claim 1, wherein the first hard phase and the second hard phase are composed of a carbonitride, and the CN ratio (nitrogen content ratio N/(C+N)) of the hard phase, on average in the sintered cermet body, is 0.42 to 0.46.

7. The cutting tool according to claim 6, wherein the CN ratio (nitrogen content ratio N/(C+N)) of the hard phase at the first face and/or the second face of the sintered cermet body is lower than the CN ratio of the hard phase in the interior portion of the sintered cermet.

8. The cutting tool according to claim 1, wherein, in the hard phase, at least a portion of the first hard phase and at least a portion of the second hard phase constitute cored structures, in which a periphery of the first hard phase is surrounded by the second hard phase, a percentage of the first hard phase constituting cored structures is 60 to 90 area % of all of the first hard phase, and a percentage of the second hard phase constituting cored structures is 40 to 80 area % of all of the second hard phase.

* * * * *